United States Patent
Andrianakou et al.

(10) Patent No.: US 9,720,748 B1
(45) Date of Patent: Aug. 1, 2017

(54) PREDEFINED INTENTS FOR NATIVE APPLICATIONS

(71) Applicant: Google Inc., Mountain View, CA (US)

(72) Inventors: Sofia Andrianakou, Sunnyvale, CA (US); Yuanying Xie, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 37 days.

(21) Appl. No.: 14/632,802

(22) Filed: Feb. 26, 2015

(51) Int. Cl.
G06F 3/00 (2006.01)
G06F 9/44 (2006.01)
G06F 9/46 (2006.01)
G06F 13/00 (2006.01)
G06F 9/54 (2006.01)

(52) U.S. Cl.
CPC .................................. G06F 9/546 (2013.01)

(58) Field of Classification Search
None
See application file for complete search history.

(56) References Cited

U.S. PATENT DOCUMENTS

| 8,887,132 B1 * | 11/2014 | Hunter | G06F 9/44505 717/111 |
| 2002/0091714 A1 * | 7/2002 | Blaukopf | G06F 9/541 |
| 2012/0150646 A1 * | 6/2012 | Steelberg | G06Q 30/0242 705/14.55 |
| 2012/0159308 A1 * | 6/2012 | Tseng | G06F 9/4443 715/234 |
| 2014/0095589 A1 * | 4/2014 | Johnson | H04L 67/42 709/203 |
| 2015/0110077 A1 * | 4/2015 | Lee | H04W 48/20 370/332 |
| 2015/0156061 A1 * | 6/2015 | Saxena | H04L 41/0803 715/733 |
| 2015/0254310 A1 * | 9/2015 | Imaizumi | G06F 17/30554 707/723 |

OTHER PUBLICATIONS

Wallace Jackson, "Android Apps for Absolute Beginners," 2011, Apress, Second Edition, retrieved from http://lyneteam.eu/Cours/Android/Android%20Apps%20for%20Absolute%20Beginners.pdf on May 24, 2016.*

'Now available with Google Apps: Google Custom Search' [online][Retrieved on Feb. 26, 2015]; Retrieved from the Internet url: http://googleenterprice.blogspot.com/ 2010/12/now-available-with-google-apps-google_1010.html.

'The fastest route between voice search and your app' [online][Retrieved on Feb. 26, 2015]; Retrieved from the Internet url: http://android-developers.blogspot.com/2014/10/the-fastest-route-between-voice-search.html.

* cited by examiner

Primary Examiner — Tuan Dao
Assistant Examiner — William C Wood
(74) Attorney, Agent, or Firm — Fish & Richardson P.C.

(57) ABSTRACT

Methods, systems, and apparatus, including computer programs encoded on a computer storage medium, for supporting intents for native application developers.

20 Claims, 5 Drawing Sheets

PREDEFINED INTENTS FOR NATIVE APPLICATIONS

BACKGROUND

Speech recognition and speech processing systems are prevalent in many consumer electronic devices. Many of these electronic devices now utilize speech command processing techniques to invoke and perform particular operations. For example, a user device, such as a smart phone, can process speech commands to perform specified operations that include searching the web, setting an alarm, calling a particular person, and so on.

Furthermore, with the advent of tablet computers and smart phones, native applications that facilitate the performance of the various functions that operation on content retrieved over the Internet, or that operate on content local to a user device, are now very common. Many users thus have multiple applications on their mobile devices. Such applications include games, mapping applications, note taking applications, finance applications, and so on.

However, for a user to make use of the various functions supported by a native application, the native application must either be instantiated and be able to receive user input, or, alternatively, must specify to a third party application that the native application is capable of processing an "intent" for the third party application. As used in this specification, an "intent" specifies a messaging object that a first application can generate to request an action from another application. More precisely, an intent is an abstract description of an operation to be performed (an "action"), and can also specify parameter values (the data to be operated on) that are passed to a native application for processing by the specified operation. The intent provides a facility for performing runtime binding between the code in different applications.

To support the message objects from an intent recognized by a third party application, the native application developer must list the intents supported by the native application. For example, many native applications include an application manifest that includes, among other things, the data structure of the particular intents supported by the native application. Upon installation, the intents supported by the native application are discovered by the operating system and associated with the native application. Thereafter, a third party application, such as s search application, personal assistant, etc., may parse inputs to determine whether an input specifies an action and, if required, parameter values for that action. If an action is determined to be specified, the third party application may determine from the discovered intents which native application supports the action, and send a message object to instantiate the application so that the native application may perform the action and process the parameters values.

For example, a user may utter [directions to Pike Place Market Seattle]. An electronic personal assistant, making use of parsing technology, may determine the utterance specifies a mapping action to Pike Place Market in Seattle, Wash. Accordingly, if a map application is installed on the user device, the personal assistant generates a message object, e.g., [Directions: Pike Place Market, Seattle, Wash.]. The message object is directed to the map application, which causes the map application to instantiate and perform an operation to route from a current location to Pike Place Market in Seattle, Wash.

Many developers of native applications, however, are not aware of intents that can be supported by a particular operating system, or specify incorrect data structures that define the intents. Thus, many developers do not successfully integrate their native applications with services offered by such third party applications.

SUMMARY

This specification describes technologies relating to predefined intents for native applications.

In general, one innovative aspect of the subject matter described in this specification can be embodied in methods that include the actions of providing, in a native application operates independent of a browser application on a user device, a user input element that: invokes a plurality of actions for the native application, and processes data from a message object sent from a second application that is separate from the native application, wherein the message object is a request for a particular action to be performed by the native application; wherein the user input element functionally supports a plurality of predefined intent classes, each predefined intent class including a set of predefined intents specific to the predefined intent class, each predefined intent corresponding to a respective messaging object; receiving data specifying one or more of the predefined intent classes to be supported by the native application; and storing, with the native application, data describing the supported predefined intent classes for the native application; wherein upon execution of the second application at a user device in which the native application is installed, the second application, in response to determining an input to the second application specifies one of the predefined intents of the supported predefined intent classes for the native application, passes a corresponding message object to the native application that causes the native application to instantiate and process data from the message object as input in the user input element. Other embodiments of this aspect include corresponding systems, apparatus, and computer programs, configured to perform the actions of the methods, encoded on computer storage devices.

Another innovative aspect of the subject matter described in this specification can be embodied in methods that include the actions of receiving, in a first application, an input provided by a user; parsing the input and identifying a corresponding action specified by the input; accessing data stored at the user device that describes, for each native application of a plurality of native applications, supported predefined intent classes for the native application, wherein each native application of the plurality of native applications includes a respective user input element that invokes a plurality of actions for the native application and that processes data from a message object from the first application, wherein the message object is a request for a particular action to be performed by the native application; determining, based in the predefined intent classes, a native application that supports the corresponding action specified by the input; generating a message object specifying a request for the correspond action to be performed by the native application; and causing the native application to be instantiated at the user device and process data from the messaging object as input in the user input element. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The systems and methods described in this document allow native applications to support typed or voice queries that launch directly into the native application without requiring developers to specify each particular intent supported. The native application developer may more conveniently provide additional functionality in the native application, for example by linking a user input element used in the native application to a third party search engine. By simply integrating the user input element in the native application as a search bar input user interface, and exposing the native application content to the third party search engine for indexing, the developer is relieved of building and maintain a proprietary search capability. This reduces the development cycle time and resource requirements of native application developers, and allows developers to provide best-in-class functionality from supporting applications.

The association of predefined intents with the user interface element exposes the developer to all available intents, and the developer need only select which intents the native application is to support. Examples of such intents include play intents to play back media, search intents to search for content, task intents to perform tasks such as note taking, creating a calendar entry, etc. The developer need not code the intents, or search for supported intents. Thus, no additional code or integrations are required.

By processing searches for developers, the third party search system may allow application developers to limit search to their own applications, or expand it to include a larger search corpus. This provides native application developers added flexibility to define various corpora search options in their native applications that would not otherwise be available had the developers developed a proprietary search capability. This, in turn, leads to a greater likelihood that users' informational needs will be satisfied, desired actions implemented, and so on.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
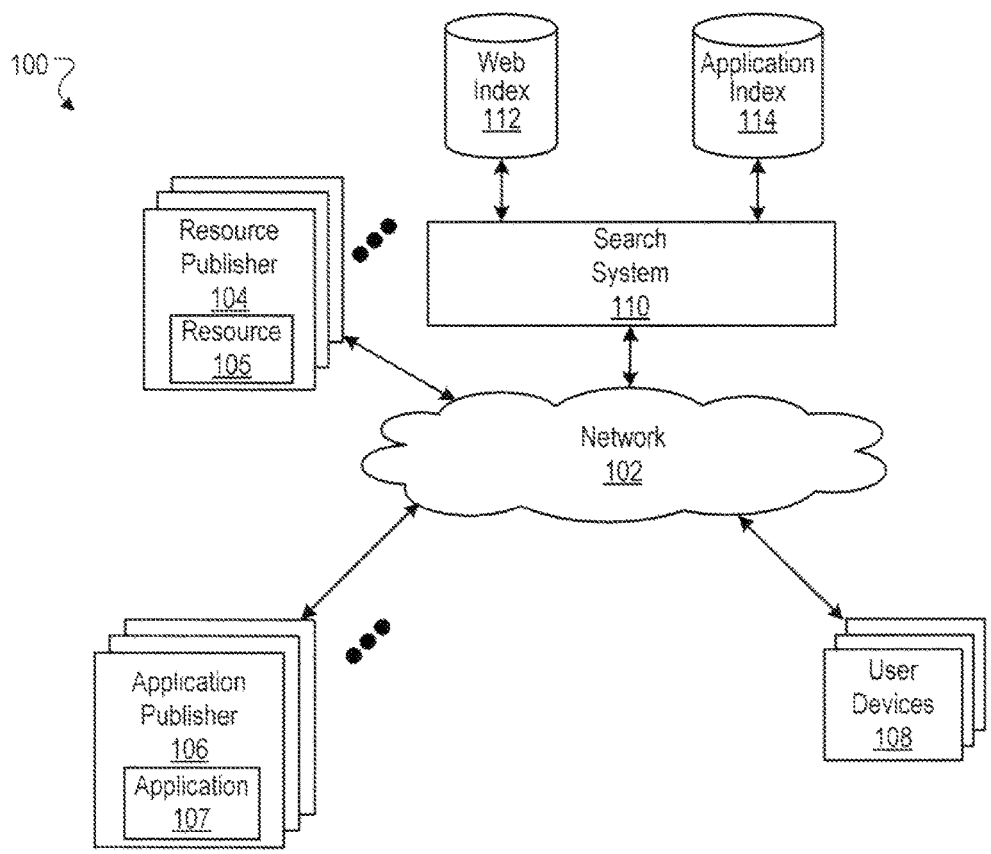
FIG. 1A is a block diagram of an example environment in which native applications are published.

FIG. 1A is a block diagram of an example environment 100 in which native applications 107 are published. A computer network 102, such as the Internet, connects resource publisher web sites 104, application publishers 106, user devices 108 and a search system 110.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL), a uniform resource indicator (URI) for deep linking into a native application, etc. Web resources may be HTML pages, images files, video files, audio files, and feed sources, to name just a few. The resources may include embedded information, e.g., meta information and hyperlinks, and/or embedded instructions, e.g., client-side scripts.

An application publisher website 106 may also include one or more web resources 105, and also provides native applications 107. As described above, a native application 107 is an application specifically designed to run on a particular user device operating system and machine firmware, and is a separate application from a browser application.

A user device 108 is an electronic device that is under the control of a user. A user device 108 is typically capable of requesting and receiving web page resources 104 and native applications 107 over the network 102. Example user devices 108 include personal computers, mobile communication devices, and tablet computers.

To search web resources 105 and the native applications 107, the search system 110 accesses a web index 112 and an application index 114. The web index 112 is an index of web resources 105 that has, for example, been built from crawling the publisher web sites 104. The application index 114 is an index of native application pages for native applications 107, and content for the native applications. Typically native application publishers expose their content to the search system 110 for crawling and indexing. Although shown as separate indexes, the web index 112 and the application index 114 can be combined in a single index.

The user devices 108 submit search queries to the search system 110. In response to each query, the search system 110 accesses the web index 112 and the application index 114 to identify resources and applications, respectively, that are relevant to the query. The search system 110 may, for example, identify the resources and applications in the form of web resource search results and native application search results, respectively. Once generated, the search results are provided to the user device 108 from which the query was received.

Some of the user devices use an assistant application published by the search engine 110. The assistant application takes user input, either typed or spoken, and processes the input to determine whether to submit the query to the search system 110 for processing as a search query, or to invoke a particular native application to perform an action. To make the determination of the latter, the assistant application must be able to determine which native application supports a detected intent.

Figure 1B:
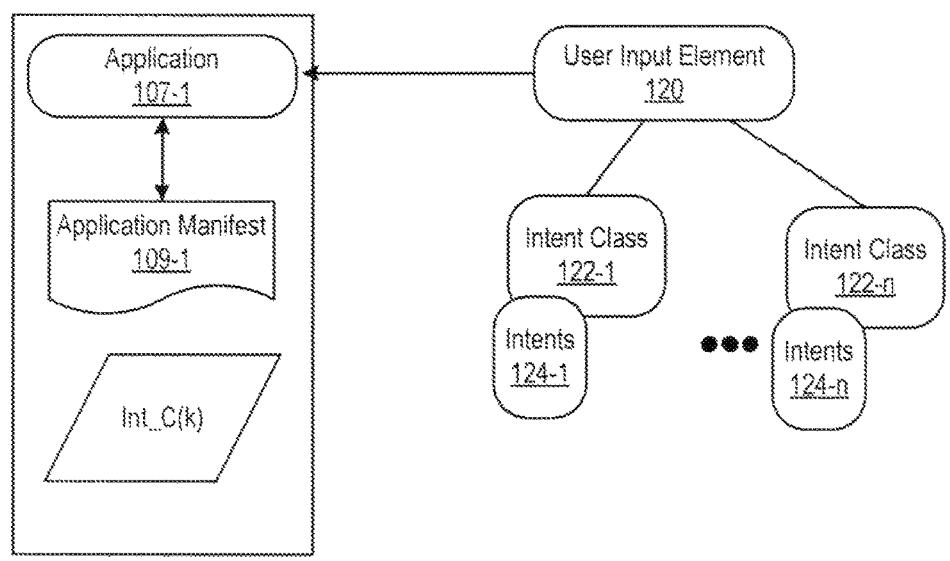
FIG. 1B is a block diagram illustrating the integration of a user input element with predefined intent classes and intents.

In some implementations the search system 110 publishes, for inclusion in native applications by application developers, a user input element 120. FIG. 1B is a block diagram illustrating the integration of a user input element 120 with predefined intent classes and intents.

The user input element 120 may support any type of appropriate input for the native application. For example, the user input element may be integrated with text and speech processing capabilities to resolve text input to a particular action. Thus, a media application may resolve an artist name as an artist search, and may resolve a particular song name to a command to play the particular song. Likewise, a restaurant application may resolve a restaurant name alone as a search for the restaurant, but may resolve the restaurant name with the word "reservation" as a command to make a reservation at the named restaurant, etc.; for a map application, the user input element 120 may attempt to resolve the input to an address or location to support a mapping action. In the examples that follow, the user input element 120 is a multi-purpose "search bar" for use in the native application. The search bar may be configured to process inputs for the native application and resolve the inputs to different actions. Furthermore, as will be described below, when the native application is invoked by a third party application in response to the third party application resolving an input to an intent supported by the native application, the resolved intent is specified to the input element 120 by the third party application.

There are thus multiple different actions that can be supported by the user input element 120. Accordingly, the user input element 120 is associated with multiple predefined intent classes 122-1 . . . n, and each intent class 122 has corresponding predefined intents 124. Thus, an application publisher, by incorporating the user element 120 in a native application, can readily and easily implement any predefined intent that the developer wants the native application to support.

For example, as shown in FIG. 1, the native application 107-1 has stored data, such as XML data, in its application manifest file, that describes that the native application 107-1 can support intents that belong to the predefined class of intents Int_C(k). Thus a developer need not individually list all such intents, nor search for the intent data structures. Instead, by integrating the user input element 120 provided by the search system 110, all available intents are exposed to the publisher, and the publisher may easily select individual intents or sets of intents.

Figures 2A, 2B:
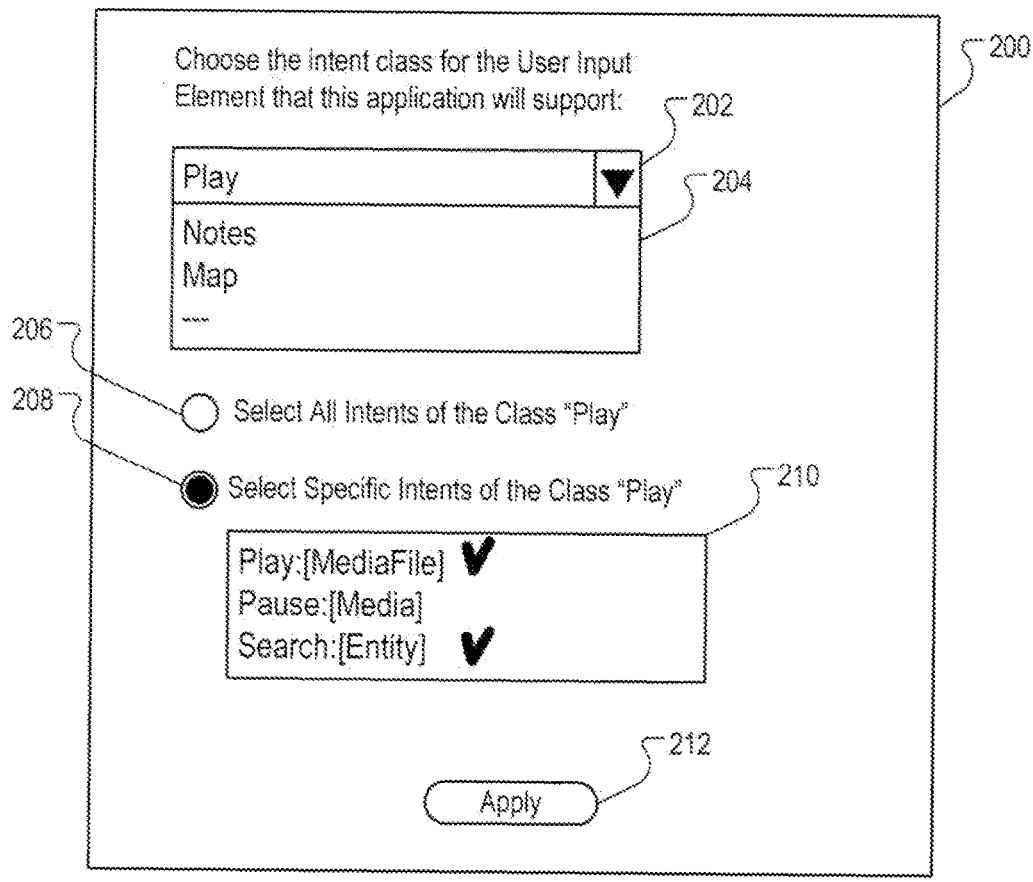
FIG. 2A is an illustration of a user interface for selecting predefined intents for a native application.
FIG. 2B is an illustration of a user interface displaying predefined intents associated with native applications.

FIG. 2A is an illustration of a user interface 200 for selecting predefined intents for a native application. In this example, and in a separate step not shown here, a developer has included the user input element 120 within the native application. In so doing, the developer is presented with user interface 200 for selecting from multiple predefined classes of intents. User interface 200 may, for example, be a drop down menu 202 that shows all predefined classes in a drop down box 204. In FIG. 2A only three predefined intent classes are shown—Play, Notes, and Map—but additional classes may also be defined.

Here, the developer has selected the predefined intent class Play, and may, by use of radio buttons, 206 and 208, either select all intents for the intent class Play, or may select specific predefined intents that belong to the predefined intent class. In the example of FIG. 2A, the developer has selected the predefined intent Play:[MediaFile] and Search:[Entity]. Each selected intent specifies an action: Play, for example, causes the native application to play a specified file, while Search causes the native application to search for a particular entity, such as an artist or song.

FIG. 2B is an illustration of a user interface 220 displaying predefined intents associated with native applications. Two native applications are listed—Ex_AP1 and Ex_AP2. The native application Ex_AP1, which is an example note taking application, supports all predefined intents that belong to the predefined class of intents Notes. The native application Ex_AP2, which is an example media playing application, only supports the predefined intents of Play and Search. The information displayed in the user interface 220 can be obtained, for example, by processing the application manifest (or other metadata) provided with each native application by the developer.

Figure 3:
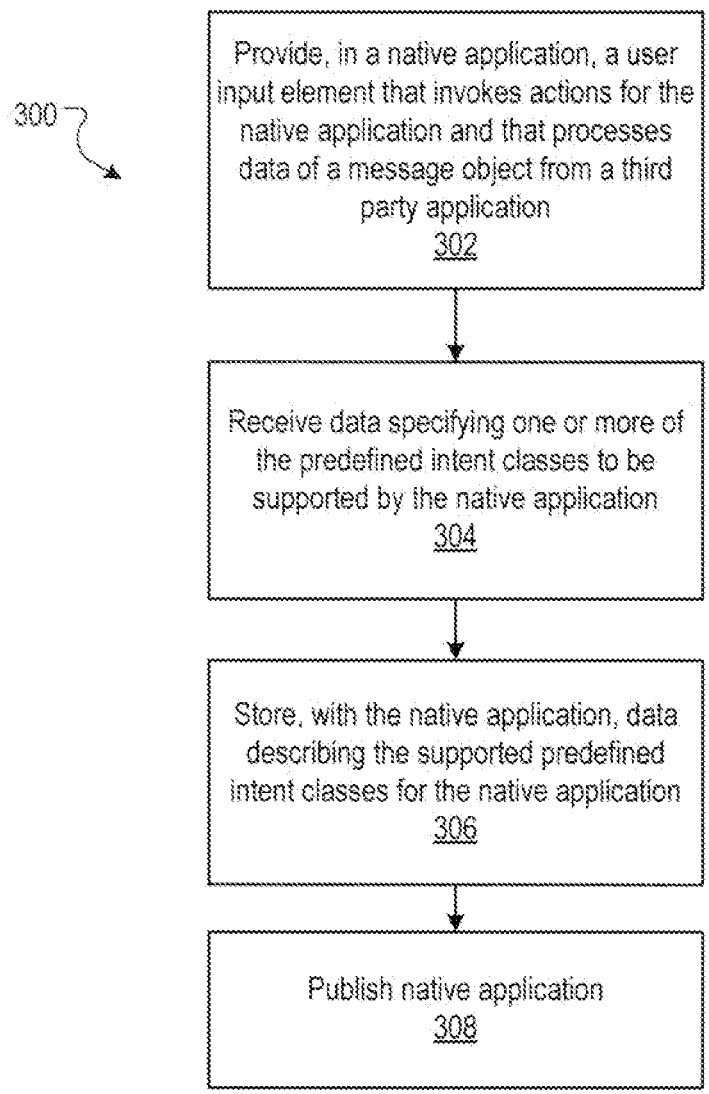
FIG. 3 is a flow diagram of an example process for associating predefined intents with a native application.

FIG. 3 is a flow diagram of an example process 300 for associating predefined intents with a native application. The process 300 can be implemented in a computer system, such as a computer system used by a developer to create and publish native applications.

The process 300 provides, in a native application, a user input element that invokes actions for the native application and that processes data from a message object from a third party application (302). For example, a developer may include the user input element, such as a search bar, in a native application. The user input element can invoke different actions for the native application in response to data from a message object from a third party application. The message object is a request for a particular action to be performed by the native application, and can be generated by a third party application by processing of an intent specified for the native application.

The process 300 receives data specifying one or more of the predefined intent classes to be supported by the native application (304). The user input element functionally supports multiple predefined intent classes, where each predefined intent class includes a set of predefined intents specific to the predefined intent class. Each predefined intent also corresponds to a respective messaging object. For example, the messaging object specifies the action and data parameter values of the intent data structure. A developer selects which predefined intents are to be supported by the native application.

The process 300 stores, with the native application, data describing the supported predefined intent classes for the native application (306). For example, an application manifest for the native application may list data describing the predefined intent class supported by the native application.

The process 300 publishes the native application (308). For example, the developer makes the native application available to users. The native application package that is downloaded by users includes the application manifest (or other metadata that describes the supported predefined intent classes). A user device operating system processes the application manifest during the application installation to register which intents the native application supports. Alternatively, the third party application can process the manifests at run time to determine, for each installed native application, which intents the native application supports.

Figure 4:
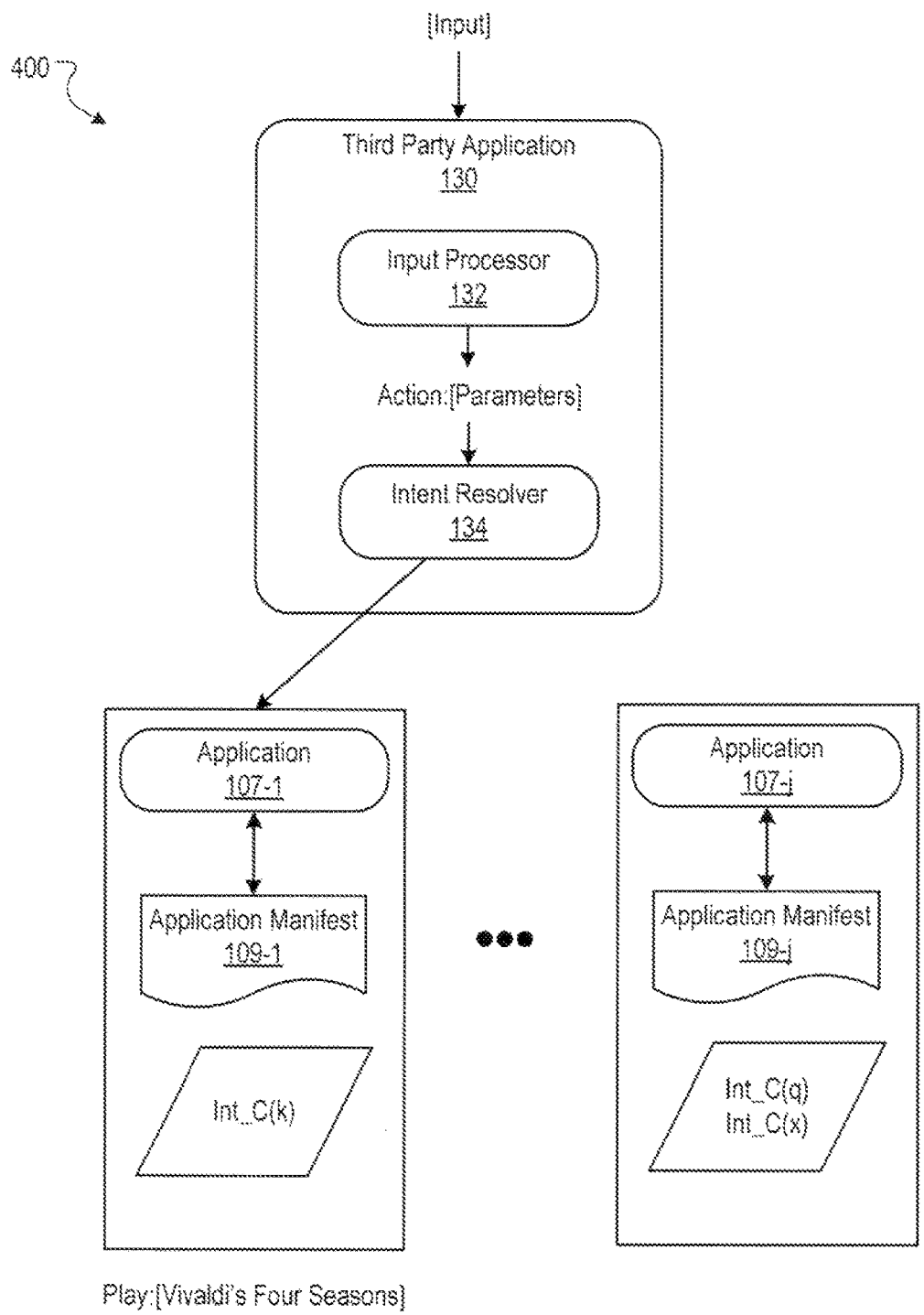
FIG. 4 is a system flow diagram illustrating the detection and resolution of intents to a native application using predefined intents.
Figure 5:
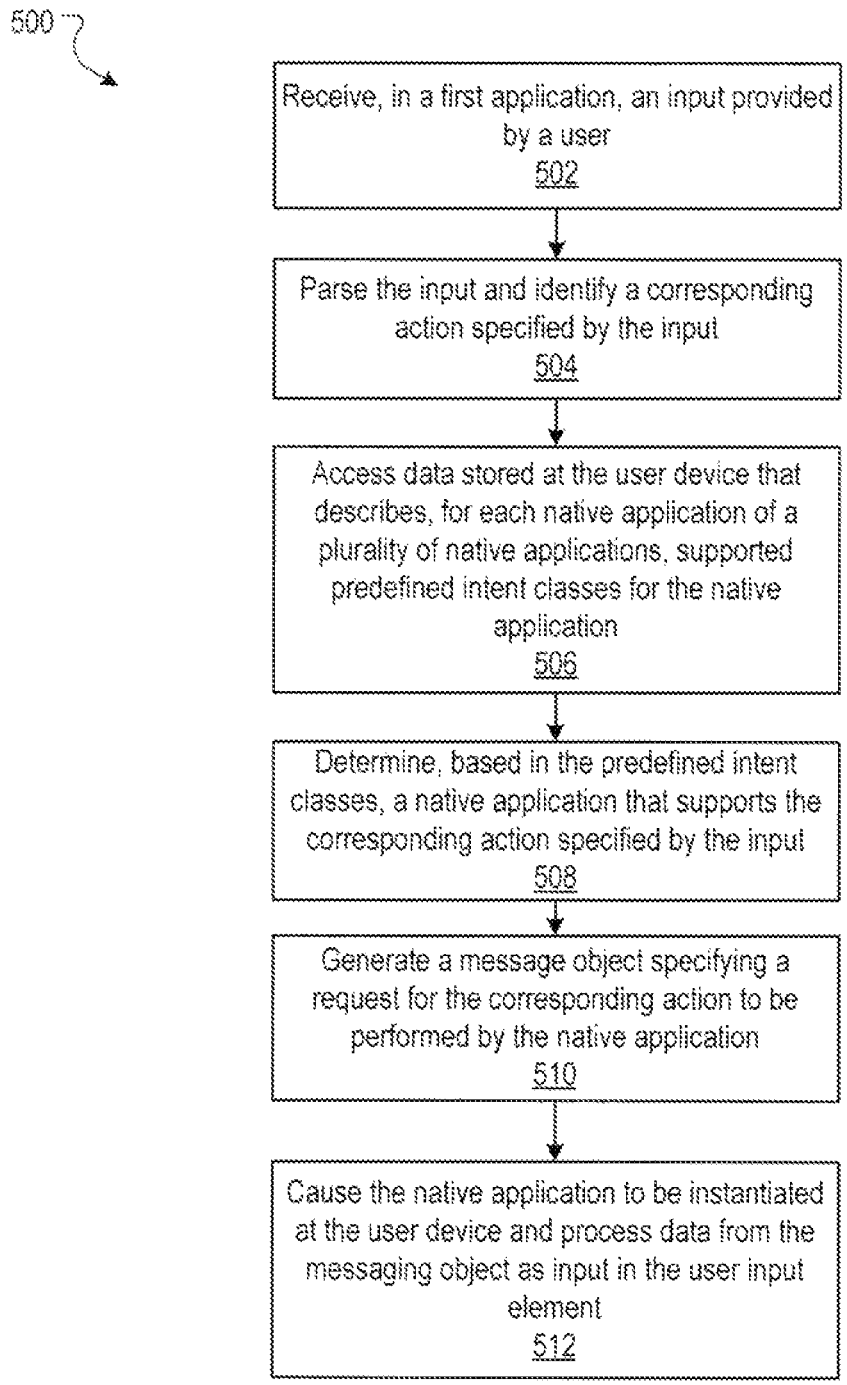
FIG. 5 is a flow diagram of an example process for detecting and resolving intents to a native application using predefined intents.

FIG. 4 is a system flow diagram 400 illustrating the detection and resolution of intents to a native application using predefined intents. The flow diagram 400 is described with reference to FIG. 5, which is a flow diagram of an example process 500 for detecting and resolving intents to a native application using predefined intents.

The process 500 receives, in a first application, an input provided by a user (502). For example, as shown in FIG. 4, an input is received by the application 130. An example of an application 130 is a search application and assistant that parses input and submits the query as a search query to a search engine if the input does not resolve to an action.

The process 500 parses the input and identifies a corresponding action specified by the input (504). For example, the application 130 includes an input processor 132. Any appropriate input processor can be used, including speech to text processors, grammar parsers, and the like. The input processor 132 is programmed to identifying actions specified by the input, and corresponding parameters for that action. Using grammars, semantic detectors, and other techniques, the input processor 132 can distinguish between general search commands and commands that are intended to invoke a particular action for a native application.

For example, for the input [I want to listen to Vivaldi's Four Seasons], the input processor 132 determines the input is a command sentence that specifies an action—Play—and a corresponding parameter value of [Vivaldi's Four Seasons]. Because a candidate action and parameter value are determined, the input processor 132 sends the action and parameters to an intent resolver 134.

The process 500 accesses data stored at the user device that describes, for each native application installed on the user device, supported predefined intent classes for the native application (506). For example, the intent resolver 134 may interrogate each application manifest file to determine whether its corresponding native application supports the "Play" intent. As shown in FIG. 4, manifests 109-1-109-j are interrogated to determine which, if any, specify a Play intent. Alternatively the operating system may have stored, for each native application, which intents the native application supports.

The process 500 determines, based in the predefined intent classes, a native application that supports the corresponding action specified by the input (508). With reference to FIG. 4, if none of the manifests specify a Play intent, then the application 130 may process the input as a query for the search engine 110. Conversely, if one native application supports the intent, such as the native application 107-1, then the process 500 generates a message object specifying a request for the corresponding action to be performed by the native application (510).

The process 500 causes the native application to be instantiated at the user device and process data from the messaging object as input in the user input element (512). For example, as shown in FIG. 4, the native application 107-1, which is a media player application, will search for a media file "Vivaldi's Four Seasons" and, if found, play back the media file in the user device.

If more than one native application supports an intent, then the intent resolver 134 may select one of the native applications based on a metric, such as popularity, network use, device type, etc. For example, the native application used most often by the user will be selected. Alternatively, the intent resolver 134 may present a disambiguation dialog from which the user may select one of the native applications.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:

providing, for inclusion in a native application that operates independent of a browser application on a user device, a user input element that:

invokes a plurality of actions for the native application; and processes data from a message object sent from a second application that is separate from the native application, wherein the message object is a request for a particular action to be performed by the native application;

wherein the user input element functionally supports a plurality of predefined intent classes, each predefined intent class including a set of predefined intents specific to the predefined intent class, each predefined intent corresponding to a respective messaging object;

receiving data specifying a set of one or more of the predefined intent classes to be supported by the native application, wherein the set is a subset of the predefined intent classes selected from a plurality of the predefined intent classes and the set defines supported predefined intent classes for the native application; and storing, with the native application, data describing the supported predefined intent classes for the native application; wherein upon execution of the second application at a user device in which the native application is installed, the second application being different from the native application, in response to determining an input to the second application specifies one of the predefined intents of the supported predefined intent classes for the native application, the second application passes a corresponding message object to the native application that causes the native application to instantiate and process data from the message object as input in the user input element.

2. The computer implemented method of claim 1, wherein storing, with the native application, data describing the supported predefined intent classes for the native application comprises storing the data describing the supported predefined intent classes in an application manifest of the native application.

3. The computer implemented method of claim 1, wherein the user input element is a search query input element to receive search terms for searching content specific to the native application.

4. The computer implemented method of claim 3, wherein the search query input element provides the search terms for searching content specific to the native application to a third party search service that is separate from a publisher of the native application and the content of the native application.

5. The computer implemented method of claim 1, wherein the predefined intent classes include a media play class, and the predefined intents of the media play class include a play media intent that causes a native application to play back a media items specified by data in the corresponding message object, and a search media intent that causes a search service to search for media specified by data in the corresponding message object.

6. A computer-implemented method performed by a user device, the method comprising:
receiving, in a first application, an input provided by a user;
parsing, by the first application, the input and identifying a corresponding action specified by the input;
accessing, by the first application, data stored at the user device that describes, for each native application of a plurality of native applications and each of the native applications being different from the first application, a set of one or more supported predefined intent classes for the native application, wherein each native application of the plurality of native applications includes a respective user input element that invokes a plurality of actions for the native application and that processes data from a message object from the first application, wherein the message object is a request for a particular action to be performed by the native application, and wherein the set is a subset of the predefined intent classes selected from a plurality of the predefined intent classes and the set defines supported predefined intent classes for the native application;
determining, by the first application, based in the predefined intent classes, a native application that supports the corresponding action specified by the input;
generating, by the first application, a message object specifying a request for the correspond action to be performed by the native application; and
causing, by the first application, the native application to be instantiated at the user device and process data from the message object as input in the user input element.

7. The computer-implemented method of claim 6, wherein accessing data stored at the user device that describes, for each native application of a plurality of native applications, supported predefined intent classes for the native application comprises accessing an application manifest for each of the native applications.

8. The computer implemented method of claim 6, wherein the user input element is a search query input element to receive search terms for searching content specific to the native application.

9. The computer implemented method of claim 8, wherein the search query input element provides the search terms for searching content specific to the native application to a third party search service that is separate from a publisher of the native application and the content of the native application.

10. The computer implemented method of claim 6, wherein at least one native application is a media playback native application, and the predefined intent classes supported by the media playback application include a media play class, and the predefined intents of the media play class include a play media intent that causes a native application to play back a media items specified by data in the corresponding message object, and a search media intent that causes a search service to search for media specified by data in the corresponding message object.

11. A system, comprising:
a data processing apparatus; and
software stored in non-transitory computer readable storage medium storing instructions executable by the data processing apparatus and that upon such execution cause the data processing apparatus to perform operations comprising:
providing, for inclusion in a native application that operates independent of a browser application on a user device, a user input element that:
invokes a plurality of actions for the native application; and
processes data from a message object sent from a second application that is separate from the native application, wherein the message object is a request for a particular action to be performed by the native application;
wherein the user input element functionally supports a plurality of predefined intent classes, each predefined intent class including a set of predefined intents specific to the predefined intent class, each predefined intent corresponding to a respective messaging object;
receiving data specifying a set of one or more of the predefined intent classes to be supported by the native application, wherein the set is a subset of the predefined intent classes selected from a plurality of the predefined intent classes and the set defines supported predefined intent classes for the native application; and
storing, with the native application, data describing the supported predefined intent classes for the native application; wherein
upon execution of the second application at a user device in which the native application is installed, the second application being different from the native application, in response to determining an input to the second application specifies one of the predefined intents of the supported predefined intent classes for the native application, the second application passes a corresponding message object to the native application that causes the native application to instantiate and process data from the message object as input in the user input element.

12. The system of claim 11, wherein storing, with the native application, data describing the supported predefined intent classes for the native application comprises storing the data describing the supported predefined intent classes in an application manifest of the native application.

13. The system of claim 11, wherein the user input element is a search query input element to receive search terms for searching content specific to the native application.

14. The system of claim 13, wherein the search query input element provides the search terms for searching content specific to the native application to a third party search service that is separate from a publisher of the native application and the content of the native application.

15. The system of claim 11, wherein the predefined intent classes include a media play class, and the predefined intents of the media play class include a play media intent that causes a native application to play back a media items specified by data in the corresponding message object, and a search media intent that causes a search service to search for media specified by data in the corresponding message object.

16. A non-transitory computer readable storage medium storing instructions executable by a data processing apparatus and that upon such execution cause the data processing apparatus to perform operations comprising:
   providing, for inclusion in a native application that operates independent of a browser application on a user device, a user input element that:
      invokes a plurality of actions for the native application; and
      processes data from a message object sent from a second application that is separate from the native application, wherein the message object is a request for a particular action to be performed by the native application;
      wherein the user input element functionally supports a plurality of predefined intent classes, each predefined intent class including a set of predefined intents specific to the predefined intent class, each predefined intent corresponding to a respective messaging object;
   receiving data specifying a set of one or more of the predefined intent classes to be supported by the native application, wherein the set is a subset of the predefined intent classes selected from a plurality of the predefined intent classes and the set defines supported predefined intent classes for the native application; and
   storing, with the native application, data describing the supported predefined intent classes for the native application; wherein
   upon execution of the second application at a user device in which the native application is installed, the second application being different from the native application, in response to determining an input to the second application specifies one of the predefined intents of the supported predefined intent classes for the native application, the second application passes a corresponding message object to the native application that causes the native application to instantiate and process data from the message object as input in the user input element.

17. The non-transitory computer readable storage medium of claim 16, wherein storing, with the native application, data describing the supported predefined intent classes for the native application comprises storing the data describing the supported predefined intent classes in an application manifest of the native application.

18. The non-transitory computer readable storage medium of claim 16, wherein the user input element is a search query input element to receive search terms for searching content specific to the native application.

19. The non-transitory computer readable storage medium of claim 18, wherein the search query input element provides the search terms for searching content specific to the native application to a third party search service that is separate from a publisher of the native application and the content of the native application.

20. The non-transitory computer readable storage medium of claim 16, wherein the predefined intent classes include a media play class, and the predefined intents of the media play class include a play media intent that causes a native application to play back a media items specified by data in the corresponding message object, and a search media intent that causes a search service to search for media specified by data in the corresponding message object.

* * * * *